United States Patent [19]
Pinkas

[11] Patent Number: 5,841,871
[45] Date of Patent: Nov. 24, 1998

[54] METHOD FOR AUTHENTICATING A USER WORKING IN A DISTRIBUTED ENVIRONMENT IN THE CLIENT/SERVER MODE

[75] Inventor: Denis Pinkas, Chaville, France

[73] Assignee: Bull S.A., Louveciennes, France

[21] Appl. No.: 751,740

[22] Filed: Nov. 18, 1996

[30] Foreign Application Priority Data

Nov. 20, 1995 [FR] France .................................. 95 13741

[51] Int. Cl.⁶ ....................................................... H04L 9/00
[52] U.S. Cl. ................................ 380/25; 380/21; 380/23; 380/49
[58] Field of Search ................................ 380/21, 23, 25, 380/49; 395/187.01, 188.01

[56] References Cited

U.S. PATENT DOCUMENTS

| | | | |
|---|---|---|---|
| 5,418,854 | 5/1995 | Kaufman et al. ........................... | 380/23 |
| 5,515,439 | 5/1996 | Bantz et al. ................................ | 380/23 |
| 5,590,199 | 12/1996 | Krajewski, Jr. et al ................... | 380/25 |
| 5,619,573 | 4/1997 | Brinkmeyer et al. ...................... | 380/23 |

OTHER PUBLICATIONS

IBM Technical Disclosure Bulletin, vol. 36, No. 11, Nov. 1, 1993; pp. 285–189, XP000424864; "Method of Authenticated Password or Passphrase Changing".

Data Communications, vol. 24, No. 1, Jan. 1, 1995, p. 122 124 XPOOO480828, Johnson, J.T. : Sign On and Be Safe IBM's Network Security Program (NETSP).

ISOC Symposium On Network and Systems Security, Jan. 1, 1994, pp. 151–157, XP000565853, Haller, N.M., "The S/Key (TM) One–Time Password System".

IEEE Communications Magazine Sep. 1994, U.S., pp. 33–38, XP002010524, B.C. Neuman et al. : "Kerberos: An Authentication Service for Computer Networks".

*Primary Examiner*—Thomas H. Tarcza
*Assistant Examiner*—Pinchus M. Laufer
*Attorney, Agent, or Firm*—Kerkam, Stowell, Kondracki & Clarke, P.C.; Edward J. Kondracki

[57] ABSTRACT

A method for authenticating a user working in a distributed environment in the client/server mode, wherein each authentication is performed from a single piece of authentication information, known as the "passphrase", having a predetermined length and duration of use (as a function of a tally value). The method is applicable to either a one-time password (OTP) system or an OTP system integrated with a Kerberos system, or in a one-time password system used alone, and the method may be used from a trusted terminal or an untrusted terminal. A method is provided that enables reinitializing the "passphrase" at the end of the duration of use with security, even in the event of active interception, and either in an OTP system integrated with a Kerberos system, or in an OTP system used alone.

8 Claims, No Drawings

METHOD FOR AUTHENTICATING A USER WORKING IN A DISTRIBUTED ENVIRONMENT IN THE CLIENT/SERVER MODE

BACKGROUND OF THE INVENTION

The present invention relates to a method for authenticating a user working in a distributed environment in a client/server mode, each authentication being performed on the basis of only a single piece of authentication information that has to be memorized, known as the "passphrase" (function of a tally value).

In general, in information processing and particularly with the complex networks in distributed systems, it is indispensable to provide and organize services that make it possible to assure the security of the distributed environment. Using an open, distributed information processing system has enormous advantages, since a user is then able to access different data of such systems, regardless of the geographical location of the user and regardless of the system in which the data is located. However, if the user wishes to benefit from these advantages, then he will also want certain data, considered to be confidential or critical, to be protected and for access to such data to be authorized only to certain users, under prearranged conditions and conventions. In a known manner, security systems, particularly in distributed information processing, are composed of functions that supplement those furnished by individual platforms or applications, such as access control, auditing, integrity, and authentication of the origin of the data relating to the questions and answers of the users.

Currently, the condition required to authorize communications while reducing the inherent insecurity of the use of such systems is that the users or the different systems that seek to make a connection are authenticated, which means that a "call" must be started at the time of the initial connection request. However, it should be noted that traditional authentication techniques using direct transfer (that is, as communicated to the user by the information processing terminal) of a password over a communications line have proved to be too vulnerable to certain of attacks to constitute an effective, unique response to this security requirement. The current trend is to instead dedicate an authentication based on cryptographic techniques, which furnish another kind of solution that is more effective. Simple encrypted passwords are not sufficient, however, and it has consequently been necessary to develop more powerful technologies, such technologies include the one-time password systems, called "one-time passwords" (OTP) by those skilled in the art OTP systems utilize a sufficiently long piece of secret information called a "passphrase", and are described in the document entitled "A One-Time Password System" by Neil Haller and Craig Metz, published as an "INTERNET DRAFT" on Oct. 23, 1995. The various systems currently used of this type are in fact derived from the S/Key system. A description of this system having been provided by Neil Haller in the proceedings of the conferences of the ISOC Symposium on Security of Networks and Distributed Systems in San Diego, entitled "The S/KEY One-Time Password System" published in February 1994, the systems of the Kerberos type (Kerberos was developed by the Massachusetts Institute of Technology), use a protocol which is described in RFC 1510 "The Kerberos Network Authentication Service [V5]", September 1993, published by the IETF (Internet Engineering Task Force).

The technology of authenticating one-time password systems (hereinafter called OTP for the sake of simplicity and brevity), in which these passwords, as the name indicates, cannot be used more than a single time as an authentication means, was developed to authorize access to systems and various applications which require authentication, designed to prevent passive attacks, that is, attacks based on fraudulent use, after capture of reusable passwords on the network after a connection. One such form of attack against network processing systems can be made subsequent to "tapping" connections in the network, done in order to intercept information relating to authentication, where this information, once intercepted, is then used to access the processing system. The OTP systems have been designed to parry such an attack, which one skilled in the art also calls a replay attack. An OTP system in fact uses a secret "passphrase", known only to the user, to generate a sequence of passwords of the OTP type. The secret "passphrase" of the user is thus, with this system, never present in the network, which renders the system invulnerable to passive attack. However, this system has certain disadvantages, because although it is especially well defended against passive attacks, it proves to be ineffective to what are known as active attacks; that is, it furnishes no protection whatever against an attack in which an intruder intercepts and blocks and then "replays" or modifies the information being transmitted. With respect more particularly to the S/Key system, which is the OTP mechanism from which the various OTP systems have been derived, the password that is seen by the network is, as its name indicates, never the same twice. This password is calculated from a secret "passphrase" known only to the user, which means that the server never knows this "passphrase". The server initially stores either an initial value intended to verify the first OTP to be received or the last OTP received following a successful authentication. It also stores the number of values remaining to be received.

The initial value, intended to verify the first OTP to be received, is calculated by the following steps. A prior step consists of concatenating the "passphrase" with a "seed" (as it is known to one skilled in the art) that is specific to the server.

This makes it possible to use the same "passphrase" for a plurality of servers. Then, in the next step, an irreversible compression function (called a "hash" function by one skilled in the art) is applied "n+1" times and the result is then communicated and then stored in the server associated with this tally (n+1).

At the time of an authentication, the server communicates the value of the "seed" and the current tally m.

This tally m specifies to the user the number of iterations to be performed in order to apply the hash function.

At the time of the verification, the server performs one and only one additional hash function iteration of the value received, and then if it obtains the same value as the value that is stored, it considers the authentication to be successful and then substitutes the value received and decrements its tally by one unit.

This technique may be used in two different ways:
1) either from a trusted terminal (as it is known to one skilled in the art)
2) or from an arbitrary terminal (called an 'untrusted terminal' by one skilled in the art).

In the first case, the user communicates the "passphrase" to the terminal, which performs the above calculation.

In the second case, the user on a trusted terminal, calculates in advance a certain number of OTPs and copies this information down on paper. He can then enter these values, depending on his authentication needs, without forgetting, after every successful authentication, to erase the corresponding value.

Kerberos, in turn, has been the first system dedicated to the security of a distributed environment. Kerberos resides solely in the use of secret keys and is especially well-suited to use by organizations of modest size. With the current technique used by Kerberos, it is necessary to be able to decrypt a piece of information contained in the authentication server response by means of a shared secret key. Moreover, the information used for decryption is derived directly from the Kerberos password. Kerberos makes it possible to authenticate a client, for instance from its identity or a name, but does not support any other privilege (identifying access, role, membership in a group, capacities, etc.). Kerberos also supports mutual authentication as well as the integrity and confidentiality of data, but does not include any other authorization function. The Kerberos authentication technique is is based on the use of a password known as a Kerberos password. This password must be communicated by the user to a trusted terminal. If it has been "stolen" by the terminal, then the beneficiary of this theft can authenticate himself in place of the legitimate user. It should also be noted that thus far, no technique has been published for a use of Kerberos without risk on an untrusted terminal.

Hence, because of the advantages but also the weaknesses of Kerberos, various integrations with Kerberos with other systems have been contemplated or proposed. To accomplish this, extensions to the Kerberos protocol specification (RFC 1510 "The Kerberos Network Authentication Service [Version 5]", September 1993) have been defined, among which are integration with OTP systems, which proposes a method by way of which various OTP mechanisms can be supported within this protocol. However, these proposals, which suggest combining the use of OTPs with Kerberos, have as their primary consequence preventing the user from using two pieces of information for example, the Kerberos password and the "passphrase", which runs counter to the general trend of using only a single piece of information for managing user memory. In particular, the Kerberos protocol version 5 specifies a standard means by which the preauthentication data and the error indication fields in messages under Kerberos can be used to carry data of the OTP type, Although this method also has the same serious disadvantages, because the user must necessarily memorize two pieces of information of not-insignificant size: the "passphrase", which must be long enough to assure satisfactory security, which makes it impractical to know both the "passphrase" and the Kerberos password. In addition, the user cannot without risk use this method from an untrusted terminal from which he enters the Kerberos password. With such a terminal, this password can be pilfered, and thus the user can no longer use it in an isolated way, thus requiring him to systematically use the combination of the Kerberos password and the "passphrase", a combination which is more burdensome and annoying for repeated use or even daily use.

SUMMARY OF THE INVENTION

The object of the present invention is to overcome the various disadvantages of the various methods known in the prior art and to provide a method by which a single piece of authentication information is all that the user has to memorize, and which has two variants in which the user accesses his information processing system from either a trusted or an untrusted terminal, while making it possible in an easy, effective way, to maintain a high level of security.

DETAILED DESCRIPTION OF THE PREFERRED EMBODIMENTS

To achieve this object, the instant method for authenticating a user working in a distributed environment in the client/server mode, as discussed in the introduction, is notable in that it is applicable in a system of the one-time password or OTP type, integrated with a Kerberos system, or in a system of the one-time password or OTP type used alone. Then a one-time password or OTP system is used and integrated with a Kerberos system, the authentication process requires the prior installation of two types of specific information in the authentication server, the pieces of information all being derived from a single, one-time, "passphrase" of sufficient length. The first type of information is calculated by the OTP method, which furnishes a verification value called the "seed" and a tally, which is the current tally m. The second type of information is calculated as follows:

Kerberos password=irreversible function ("passphrase", constant 1), where the constant 1 is a public value, or in other words is accessible and nonsecret; this makes it possible to use a single type of irreversible function for all the methods.

Thus, according to the instant invention, and counter to all expectation, a single piece of authentication information has to be memorized: the "passphrase", and this is true regardless of whether an OTP system is to be used alone or in combination with a Kerberos system and whether the user to be authenticated has access to a trusted terminal or to an untrusted terminal.

Notably, when a system of the one-time password or OTP type is used and integrated with a Kerberos system, a unique communications protocol is used between the server and the terminal, of the trusted type or untrusted type, the authentication server remaining ignorant of the fact of whether a trusted terminal or an untrusted terminal is used. This unique communications protocol is as follows:

in the direction of information exchange from the user terminal to the authentication server, the user sends his identifier and a one-time password or OTP, and if the authentication is successful, the following phrase corresponds to sending a response from the authentication server to the user terminal, this response containing an encrypted piece of information obtained by using a key calculated as follows:

encryption key=irreversible function (Kerberos password, one-time password OTP received)

while the decryption key of the response message from the server is calculated by the client using the following formula:

decryption key=irreversible function (Kerberos password, last one-time password received)

The user terminal is thus able:

either to calculate, from the "passphrase" furnished by the user, the one-time password as well as the decryption key in the case where a trusted terminal is used, or to receive these two pieces of information in the case where an untrusted terminal is used.

It is important here to emphasize that the "passphrase" must be of sufficient length, that is, at least 10 characters, to dissuade an exhaustive search for the "passphrase" based on a one-time password that would not take excessive time. It should also be stressed that advantageously, a single communications protocol is used between the server and the terminal of the user to be authenticated; that is, one and the same protocol is used, regardless of whether the terminal the user is employing is a trusted terminal or an untrusted terminal. Consequently, the authentication server remains ignorant of the fact of whether a trusted or an untrusted terminal has been used.

Characteristically, when a system of the one-time password OTP type is used integrated with a Kerberos system, if a trusted terminal is used, the user furnishes the "passphrase", the Kerberos password then being deduced using the following formula:

Kerberos password=irreversible function ("passphrase", constant 1)

while the decryption key is then deduced using the following formula:

decryption key=irreversible function (Kerberos password, previous one-time password sent).

The decryption key used by the client to decrypt the answer message from the server is thus calculated by the same formula as the one for the encryption key. Hence the client can decrypt the server answer message by using this key and will in no case have even minimal information to be encrypted.

When an untrusted terminal is used, it is important that the Kerberos password not be communicated by the user to that terminal at any moment. The technique claimed makes it possible, easily and effectively, to observe this constraint.

Notably, when a system of the one-time password OTP type is used integrated with a Kerberos system, the authentication method according to the invention can also be used with an untrusted terminal, in which case two pieces of information are used: the one-time password OTP and the decryption key, in accordance with those of the aforementioned method, which are both precalculated and recorded. Both pieces of (one time-usage) information are then entered at the untrusted terminal, while the Kerberos password is used with a trusted terminal.

Hence, when an untrusted terminal is used, the user must precalculate in advance, with the aid of a trusted terminal, the decryption keys, and he can then record them, for instance by copying them on a piece of paper. His paper will then include the following information: the value of the OTP, and the associated decryption key, for each tally value m.

Hence the present invention also offers a second advantageous aspect due to the fact that this technique can be used without risk from an untrusted terminal. With such terminals, it suffices to provide for the use of pieces of information (of the one-time use type) recorded on any data medium (for instance, preprinted forms), and to use the Kerberos password with a trusted terminal.

Advantageously, according to one of the characteristics of the invention, a technique is also proposed by which it is possible to reinitialize the "passphrase" with certainty from the same information to be memorized, even in the case of active interception, while remembering that at present the techniques used are not resistant to anything but passive tapping. In fact, as has been noted above, the "passphrase" cannot be used more than a predetermined number of times m, and once the tally m becomes equal to zero, the "passphrase" must be changed, but in the present context, although this change is to be done easily, it must also be done with the assurance of high security.

To accomplish this, notably, when a system of the one-time password OTP type is used integrated with a Kerberos system, to reinitialize the "passphrase" at the end of the duration of usage, the technique requires the prior installation of an additional piece of information at the level of the server, this information being derived from a single, one-time "passphrase" of sufficient length (at least 10 characters) and being called the "modification key", whose current calculation is as follows, the "seed" being specific to the server:

modification key=irreversible function ("passphrase", "seed", constant 2)

where constant 2 is a public value, and when it is desired to change the "passphrase", a new "passphrase" being chosen, the user sends a piece of information, imperatively from a trusted terminal, in the form of a message obtained by concatenation of the three following fields, the set of these fields being sealed with the aid of the modification key to enable detecting any nonauthorized modification of the contents of the fields:

the current value of the one-time password OTP;

the new verification value of the one-time passwords OTP to be stored in the server in the event of successful reinitialization, this new value being associated with the tally value relating to the duration of usage of the "passphrase" and to a "seed" specific to the server, allowing this same "passphrase" to be shared among a plurality of servers that do not trust one another;

simultaneously, the new value of the Kerberos password and the new value of the modification key, encrypted with the current value of the modification key;

the new verification value intended for checking the first one-time password OTP to be received being calculated by the user terminal by applying the irreversible function to it (n+1) times after concatenation of the new "passphrase" with a "seed" value specific to the server, thus allowing the use of the same "passphrase" for different servers, while for its part the server first verifies whether the first field sent is correct, by the OTP method, then verifies the integrity of the set of three fields with the aid of the current modification key which it possesses, and if the verification is successful, it then reinitializes the mechanism OTP with the aid of the new value for verifying the maximum number of uses and the "seed", then with the aid of the modification key decrypts the encrypted field and extracts the new value of the modification key and the Kerberos password, and finally locally updates the new value of the modification key and the new value of the Kerberos password.

It is important to confirm once again that at no time is the "passphrase" known to the server, nor can it be known to the server.

It is understood that in accordance the invention, this method may equally effectively be applied to changing the "passphrase" for an OTP system alone, not combined with a Kerberos system.

In that case, to reinitialize the "passphrase" at the end of the duration of usage, the same technique is used by installing an additional piece of information beforehand at the level of the server, this information being derived from a single, one-time "passphrase" of sufficient length (at least 10 characters). This additional information is the "modification key", whose current calculation is as follows, the "seed" being specific to the server:

modification key=irreversible function ("passphrase", "seed", constant 2)

where constant 2 is a public value.

This modification key is confidential. Nevertheless, simply knowing its value does not make it possible directly to commit fraud. Thus, in a manner similar to the preceding case, when it becomes necessary to change the "passphrase", a new "passphrase" being chosen, the user will send a piece of information, imperatively from a trusted terminal, in the form of a message obtained by concatenation of the three following fields, the set of these fields being sealed with the aid of the modification key to enable detecting any nonauthorized modification of the contents of the fields:

the current value of the one-time password OTP;

the new verification value of the one-time passwords OTP to be stored in the server in the event of successful reinitialization, this new value being associated with the tally value relating to the duration of usage of the "passphrase" and to a "seed" specific to the server, allowing this same "passphrase" to be shared among a plurality of servers that do not trust one another;

the new value of the modification key, encrypted by the current value of the modification key; first one-time password OTP to be received is calculated by applying the irreversible function to it (n+1) times after concatenation of the new "passphrase" with a "seed" value specific to the server, thus allowing the use of the same "passphrase" for different servers, while for its part the server first verifies whether the first field sent is correct, by the OTP method, then verifies the integrity of the set of three fields with the aid of the current modification key which it possesses, and if the verification is successful, it then reinitializes the mechanism OTP with the aid of the new value for verifying the maximum number of uses and the "seed", then with the aid of the modification key decrypts the encrypted field and extracts the new value of the modification key, and finally locally updates the new value of the modification key.

It is important to stress at this point the fact that these two methods of changing the "passphrase" both require the use of a trusted terminal and must in no case be performed on an untrusted terminal.

For better comprehension of the instant invention, the following description, which is understood not to be limiting, will better show the environment in which the invention is used and how it can be accomplished.

First, some reminders and details relating to the prior art represented by OTP systems will be discussed. The two fundamental elements to be considered, that is, the client and the server, function in the following way in such systems. The server must send a piece of information, which one skilled in the art calls a "challenge", the challenge being composed of the number of iterations to be performed and the value of the server-specific "seed". The client must send the proper password OTP, which is produced on the basis of the secret "passphrase" entered by the user and of the so-called "challenge information" furnished by the server. The server must then verify the OTP password received, and must store the last correct password received along with the corresponding tally value. The server must also, in an easy way with complete security, authorize the changing of the secret "passphrase" of the user.

In the OTP system, the client for his part sends the secret "passphrase" with the "seed" value, which is part of the "challenge" received from the server; the hash function is applied iteratively a number of times corresponding to the current tally value in order to obtain the OTP password, and upon each use the number of iterations of the irreversible function is decremented by one unit. Thus a unique sequence of passwords is brought about. The server verifies the password OTP received from the client by applying the irreversible function a single time and by comparing the result obtained with the preceding correctly received password OTP. In a known manner, the security of an OTP system is based in fact on the efficacy of the hash function which must be provided in order to enable simple calculation to be done in one direction, that is, the forward direction, but to prevent calculation in the opposite direction or at least render it nearly impossible.

Until now, it was unanimously acknowledged and believed to be indisputable that it was not possible to change the "passphrase" and select a new tally value stored in the server when the current tally value m had become equal to zero, without losing the advantages of the very principle of OTP systems, which was that the system should remain secure even if the information contained in the server were known.

The following will explain why an arbitrary person, knowing the value of the modification key and the verification parameters, has no possible chance of direct action. As has been noted above, the simple fact of knowing the value of the modification key does not make it possible directly to commit fraud. However, a more sophisticated attack is possible, which would require complicity with a person who could read in advance the value of the modification key and then proceed to an active attack. Thus, if in a first step, a person obtains the value of the modification key, then in a second step that person or some other person must wait until a user initiates a command to change the "passphrase", before he blocks the information and at random replaces certain fields with his own values and then recalculates at random the value for checking the integrity of the data. However, such an attack would have to be prepared for in advance, and it should also be noted that it requires the use in real time of integrity and encryption algorithms. Since full precalculation is not feasible, it is consequently impossible to commit fraud simply by making a substitution of fields.

In summary and to conclude, the instant invention can be used effectively in a one-time password OTP system integrated with a Kerberos system, or in a one-time password system OTP used alone. In an essential characteristic, when a user is using a trusted terminal, the present invention consists of using and hence having to memorize only a single piece of information, that is, the "passphrase", since the Kerberos password, in the case where a one-time password system OTP integrated with a Kerberos system is used, is in fact derived from this "passphrase". In another important characteristic, the technique described above may also be effectively used from an untrusted terminal. To do so, it suffices for the user to have precalculated and prerecorded (for example by printing them on a sheet of paper) two pieces of information, that is, a one-time password and a decryption key; these two recorded pieces of (one-time) information are then entered on the untrusted terminal, while the Kerberos password is used with a trusted terminal. Finally, according to the invention a technique is also provided by which it is possible to reinitialize the "passphrase" at the end of the usage period in a secure manner, even in the case of active interception, and of doing so in a one-time password OTP system integrated with a Kerberos system or in a one-time password OTP system used alone.

While this invention has been described in conjunction with specific embodiments thereof, it is evident that, after reading of the specification, many alternatives, modifications and variations may be suggested to those skilled in the art. Accordingly, the preferred embodiments of the invention as set forth herein, are intended to be illustrative, not limiting. Various changes may be made without departing from the spirit and full scope of the invention as set forth herein and defined in the appended claims to which reference should be made for a complete understanding of the invention.

I claim:

1. A method for authenticating a user working in a distributed environment in a client/server mode, said authentication method being applicable in a system employing a one-time password (OTP) method, integrated with a Kerberos system, said authentication method comprising the steps of installing two items of specific information in an authentication server prior to performing an authentication; authenticating the user based only on a memorized "passphrase", said passphrase being a predetermined length and having a predetermined duration of usage, deriving said specific information from said passphrase, calculating a first item of information by the OTP method, furnishing a verification value called the "seed" and a tally from the calculated first item of information which is a current tally m, and calculating a second item of information as follows:

Kerberos password=irreversible function ("passphrase", constant 1), where the constant 1 is a public value, whereby it is possible to use a single irreversible function for both the one-time password system used alone and an OTP system integrated with a Kerberos system.

2. The method for authenticating a user working in a distributed environment in a client/server mode of claim 1, wherein when said one-time password system is employed integrated with a Kerberos system, said method uses a unique communications protocol between the server and a terminal, of the trusted type or untrusted type, which unique communications protocol comprises the steps of:

sending by the user in the direction of information exchange from the user terminal to the authentication server, the user's identifier and a one-time password, and if the authentication is successful, sending a response from the authentication server to the user terminal, said response containing an encrypted piece of information obtained by using a key calculated as follows:

encryption key=irreversible function (Kerberos password, one-time password received);

and further wherein a decryption key of the response message from the server is calculated by the client using the following formula:

decryption key=irreversible function (Kerberos password, previous one-time password received);

calculating by the user terminal:
from the "passphrase" furnished by the user, the one-time password and the decryption key when a trusted terminal is used,
or receiving the two pieces of information consisting of the one-time password and the decryption key if an untrusted terminal is used.

3. The method for authenticating a user working in a distributed environment in a client/server mode of claim 2, wherein when said one-time password system is employed integrated with the Kerberos system, and a trusted terminal is used, said method further comprises furnishing by the user the "passphrase", and deducing the Kerberos password using the following formula:

Kerberos password=irreversible function ("passphrase", constant 1);

and further deducing the decryption key using the following formula:

decryption key=irreversible function (Kerberos password, previous one-time password sent).

4. The method for authenticating a user working in a distributed environment in a client/server mode of claim 2, wherein when said one-time password system is employed integrated with a Kerberos system, and an untrusted terminal is used, said method further comprising precalculating and recording the two pieces of information consisting of the one-time password and the decryption key received by said untrusted terminal.

5. The method for authenticating a user working in a distributed environment in a client/server mode of claim 2, wherein when said one-time password type system is employed integrated with a Kerberos system, said method comprising the steps of reinitializing the "passphrase" at the end of the duration of usage, said reinitialization step consisting of using an additional piece of information installed beforehand at the level of the server, said additional piece of information being derived from a single, one-time "passphrase" of sufficient length, and being called the "modification key", and calculated as follows, the "seed" being specific to the server:

modification key=irreversible function ("passphrase", "seed", constant 2);

where constant 2 is a public value, changing the "passphrase", said changing step consists of firstly sending a piece of information by the user, from a trusted terminal, in the form of a message obtained by concatenation of the three following fields, the three fields being sealed with a modification key which enables detecting any nonauthorized modification of the contents of said three fields:

a current value of the one-time password;
a new verification value of the one-time password to be stored in the server in the event of successful reinitialization, said new value being associated with the tally value relating to the duration of usage of the "passphrase" and to a "seed" specific to the server, allowing this same "passphrase" to be shared among a plurality of servers that do not trust one another; and
a new value of the Kerberos password and a new value of the modification key, encrypted with a current value of the modification key;

and secondly calculating the new verification value for checking the first one-time password to be received by the user terminal by applying the irreversible function (n+1) times after concatenation of the new "passphrase" with a "seed" value specific to the server, thus allowing the use of the same "passphrase" for different servers, and further verifying by the server first whether the first field sent is correct, by the one-time password method, then verifying the integrity of the three fields using the current modification key, and if the verification is successful, reinitializing the OTP using the new value for verifying the maximum number of uses and the "seed", then, with the aid of the modification key, decrypting the encrypted field and extracting the new value of the modification key and the Kerberos password, and locally updating the new value of the modification key and the new value of the Kerberos password.

6. The method for authenticating a user working in a distributed environment in a client/server mode of claim 1, wherein when said one-time password system is employed integrated with the Kerberos system, and a trusted terminal is used, said method further comprises the steps of furnishing by the user the "passphrase", and deducing the Kerberos password using the following formula"

Kerberos password=irreversible function ("passphrase", constant 1);

calculating the decryption key using the following formula:

decryption key=irreversible function (Kerberos password, previous one-time password sent).

7. The method for authenticating a user working in a distributed environment in a client/server mode of claim 1, wherein when said one-time password system is employed integrated with a Kerberos system, said method comprises the steps of reinitializing the "passphrase" at the end of the duration of usage, said reinitializing step consisting of using an additional piece of information installed beforehand at the level of the server, said additional piece of information being derived from a single, one-time "passphrase" of sufficient length, and being called the "modification key", and calculated as follows, the "seed" being specific to the server:

modification key=irreversible function ("passphrase", "seed", constant 2);

where constant 2 is a public value, changing the "passphrase", said changing step consists of firstly sending a piece of information by the user, from a trusted terminal, in the form of a message obtained by concatenation of the three following fields, the three fields being sealed with a modification key which enables detecting any nonauthorized modification of the contents of said three fields:
a current value of the one-time password;
a new verification value of the one-time password to be stored in the server in the event of successful reinitialization, said new value being associated with the tally value relating to the duration of usage of the "passphrase" and to a "seed" specific to the server, allowing this same "passphrase" to be shared among a plurality of servers that do not trust one another; and
a new value of the Kerberos password and a new value of the modification key, encrypted with a current value of the modification key;
and secondly calculating the new verification value for checking the first one-time password to be received by the user terminal by applying the irreversible function (n+1) times after concatenation of the new "passphrase" with a "seed" value specific to the server, thus allowing the use of the same "passphrase" for different servers, and further verifying by the server first whether the first field sent is correct, by the one-time password method, then verifying the integrity of the three fields using the current modification key, and if the verification is successful, reinitializing the one-time password using the new value for verifying the maximum number of uses and the "seed", then, with the aid of the modification key, decrypting the encrypted field and extracting the new value of the modification key and the Kerberos password, and locally updating the new value of the modification key and the new value of the Kerberos password.

8. A method for authenticating a user working in a distributed environment in a client/server mode wherein a one-time password system is employed without a Kerberos system; said authentication method comprising the steps of installing two items of specific information in an authentication server prior to performing an authentication; authenticating the user based only on a memorized "passphrase", said passphrase being a predetermined length and having a predetermined duration of usage, deriving said specific information from said passphrase, calculating a first item of information by the one time password system furnishing a verification value called a "seed" and a tally from the calculated first item of information, reinitializing the "passphrase" at the end of the duration of usage, said reinitialization step consisting of using an additional piece of information installed beforehand at the level of the server, said additional piece of information being derived from a single, one-time "passphrase" of predetermined length, and being called the "modification key", and calculated as follows, the "seed" being specific to the server:

modification key=irreversible function ("passphrase", "seed", constant 2);

where constant 2 is a public value, changing the "passphrase", said changing step consists of firstly sending a piece of information by the user, from a trusted terminal, in the form of a message obtained by concatenation of the three following fields:
(1) a current value of the one-time password;
(2) a new verification value of the one-time password to be stored in the server in the event of successful reinitialization, said new value being associated with a tally value relating to the duration of usage of the "passphrase" and to a "seed" specific to the server, allowing this same "passphrase" to be shared among a plurality of servers that do not trust one another; and
(3) a new value of the modification key, encrypted by a current value of the modification key;
the three fields being sealed with a modification key which enables detecting any non-authorized modification of the contents of said three fields;
and secondly calculating the new verification value for checking the first one-time password to be received by the user terminal by applying the irreversible function (n+1) times after concatenation of the new "passphrase" with the "seed" value specific to the server, thereby allowing the use of the same "passphrase" for different servers, and further verifying by the server first whether the first field sent is correct by the one-time password method, then verifying the integrity of the three fields using the current modification key, and if the verification is successful, reinitializing the one-time password using the new value for verifying the maximum number of uses and the "seed", then, with the aid of the modification key, decrypting the encrypted field and extracting the new value of the modification key, and locally updating the new value of the modification key.

* * * * *

UNITED STATES PATENT AND TRADEMARK OFFICE
CERTIFICATE OF CORRECTION

PATENT NO. : 5,841,871
DATED : November 24, 1998
INVENTOR(S) : Denis PINKAS

It is certified that error appears in the above-indentified patent and that said Letters Patent is hereby corrected as shown below:

Item [56] Title Page, OTHER PUBLICATIONS, line 2, after " pp." reads "285-189" should read - - 285-289 - -.

In Claim 5, Column 10, line 3 of the Patent,
Delete "type" after "password".

Signed and Sealed this

Second Day of November, 1999

Attest:

Q. TODD DICKINSON

*Attesting Officer*    Acting Commissioner of Patents and Trademarks